US00RE37636E

(19) United States
(12) Reissued Patent
Wortman et al.

(10) Patent Number: US RE37,636 E
(45) Date of Reissued Patent: Apr. 9, 2002

(54) DEMAND RADIANT HEATING SYSTEM

(75) Inventors: Joseph B. Wortman, Grosse Pointe; Cory A. Weiss, Warren, both of MI (US)

(73) Assignee: Detroit Radiant Products Company, Warren, MI (US)

(21) Appl. No.: 08/728,215

(22) Filed: Oct. 10, 1996

Related U.S. Patent Documents

Reissue of:
(64) Patent No.: 5,353,986
Issued: Oct. 11, 1994
Appl. No.: 08/077,558
Filed: Jun. 15, 1993

(51) Int. Cl.[7] ..... G05D 23/00
(52) U.S. Cl. ..... 237/2 R; 237/2 A; 237/70; 236/36; 126/92 AC
(58) Field of Search ..... 237/2 A, 2 R, 237/70; 236/36; 126/91 A; 431/62, 12, 18

(56) References Cited

U.S. PATENT DOCUMENTS

| | | | |
|---|---|---|---|
| 4,390,125 A | 6/1983 | Rozzi | |
| 4,645,450 A | 2/1987 | West | |
| 4,869,229 A | 9/1989 | Johnson | |
| 5,027,789 A | 7/1991 | Lynch | 126/116 |
| 5,076,781 A | 12/1991 | Cremers | |
| 5,112,217 A | 5/1992 | Ripka et al. | |
| 5,353,986 A | 10/1994 | Wortman et al. | |

FOREIGN PATENT DOCUMENTS

| | | |
|---|---|---|
| CA | 1292670 | 12/1991 |
| GB | 2189314 | 11/1989 |
| GB | 2263542 | 7/1993 |

OTHER PUBLICATIONS

"Livestock Radiant Heating", by K.G. Johnson Livestock Equipment (Canada) Ltd.
"Infra–Red High Intenity Brooder", on behalf of Gasmac Inc., dated Nov. 25, 1986.
"Technlsches Datenblatt Comet Warmewellen®–Heizsystem", Colt Internation GmbH, Jul. 1987.
Instructions—Champagne Astro Stat Low Voltage Multi –Stage Thermostats, White–Rodgers Division, Part No. 37–3421.*

* cited by examiner

*Primary Examiner*—Harold Joyce
*Assistant Examiner*—Derek S. Boles
(74) *Attorney, Agent, or Firm*—Howard & Howard

(57) ABSTRACT

A demand radiant heating system includes an elongated radiant heating tube and a burner operatively connected to the tube and a fuel regulator connected to the burner for providing fuel to the burner at a plurality of fuel pressures to provide demand heating.

20 Claims, 2 Drawing Sheets

FIG 1
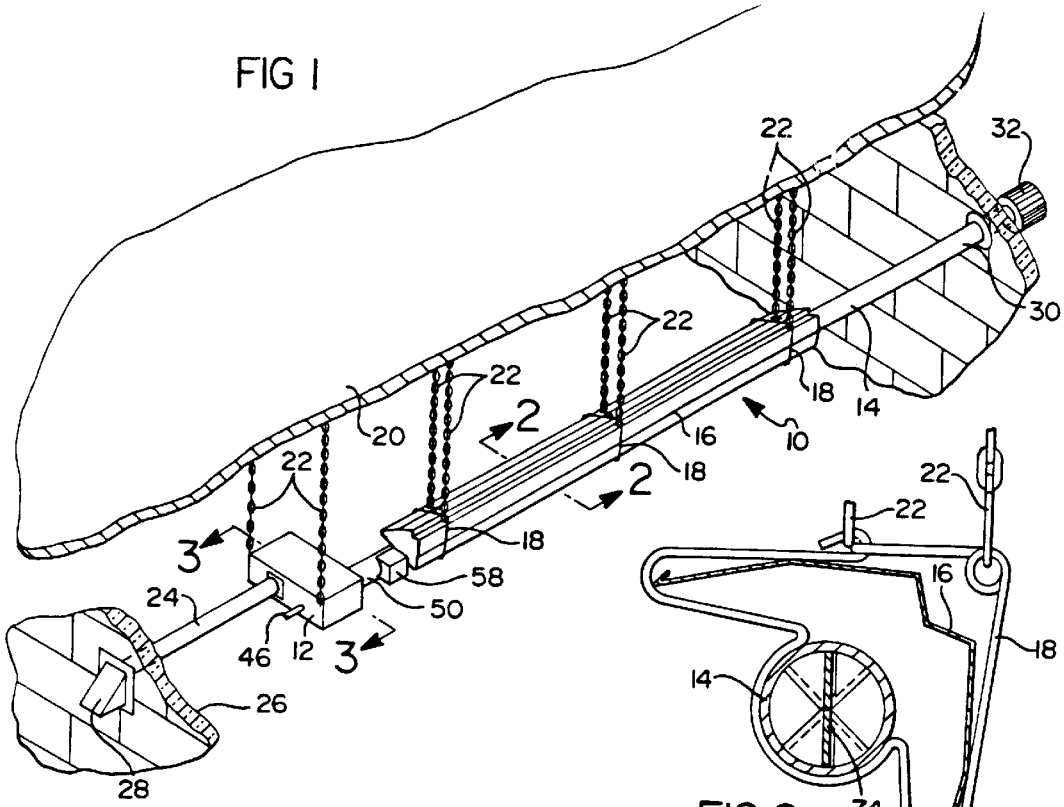
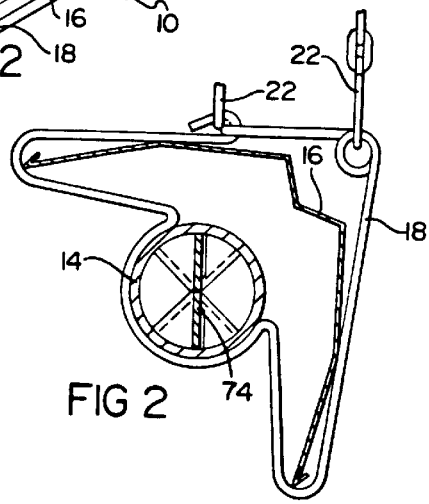
FIG 2
FIG 4
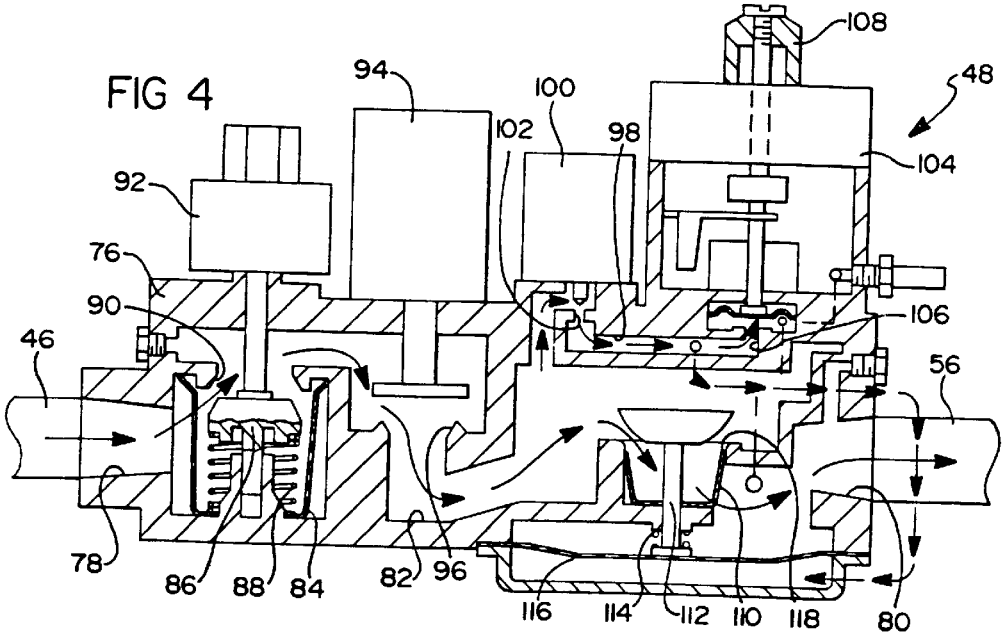

DEMAND RADIANT HEATING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to radiant heating systems and, more particularly, to a demand type of radiant heating system.

2. Description of the Related Art

It is known to provide a radiant heating system to heat a specific location in a building such as a warehouse. Typically, the radiant heating system includes a radiant heating tube having an inlet end and an exhaust end. A relatively short tube of smaller diameter than the radiant heating tube is positioned in the inlet end and spaced from an inner surface thereof to define a cylindrical passage for flow of air. A burner is positioned within the short tube. The burner has an inlet end to receive air and fuel and mixing the same and an exit end for emitting the air/fuel mixture for combustion. An example of such a radiant heating system is disclosed in U.S. Pat. No. 4,390,125 to Rozzi, the disclosure of which is hereby incorporated by reference.

Although the above-patented radiant heating system works well, it suffers from the disadvantage that it operates only on one fuel pressure setting and at predetermined times and cannot provide demand heating at any time. Another disadvantage is that a separate fuel control and regulator are used for fuel control. Yet another disadvantage is that the burner has an ignitor at one end and a separate radiant sensor for the burner which results in more parts. A further disadvantage is that the burner handles only relatively small air/fuel mixture.

SUMMARY OF THE INVENTION

It is, therefore, one object of the present invention to provide a demand type of radiant heating system.

It is another object of the present invention to provide a radiant heating system having a high demand and low demand.

It is yet another object of the present invention to provide a single fuel control capable of dual regulation.

It is still another object of the present invention to provide a single ignitor and sensor.

It is a further object of the present invention to provide a new and improved burner for a radiant heating system.

To achieve the foregoing objects, the present invention is a demand radiant heating system including an elongated radiant heating tube having an inlet end and an exhaust end. The demand radiant heating system also includes a burner operatively connected to the inlet end of the radiant heating tube. The demand radiant heating system further includes means operatively connected to the burner for providing fuel to the burner at a plurality of fuel pressures for demand heating. The fuel and air is mixed and burned by the burner to heat the radiant heating tube and exhaust gases exit the exhaust end.

one advantage of the present invention is that a radiant heating system is of a demand type providing high and low demand heating at any time. Another advantage of the present invention is that a single fuel control is provided which is capable of dual regulation. Yet another advantage of the present invention is that the demand radiant heating system has a single glow bar which both ignites air/fuel mixture and senses flame presence to serve as an ignitor and a sensor. Yet another advantage of the present invention is that the demand radiant heating system has a new and improved burner to handle larger air/fuel mixtures.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a perspective view of a demand radiant heating system according to the present invention.

FIG. 2 is a sectional view taken along line 2—2 of FIG. 1.

FIG. 4 is a sectional view taken along line 4—4 of FIG. 3.

DESCRIPTION OF THE PREFERRED EMBODIMENT(S)

Figure 3:
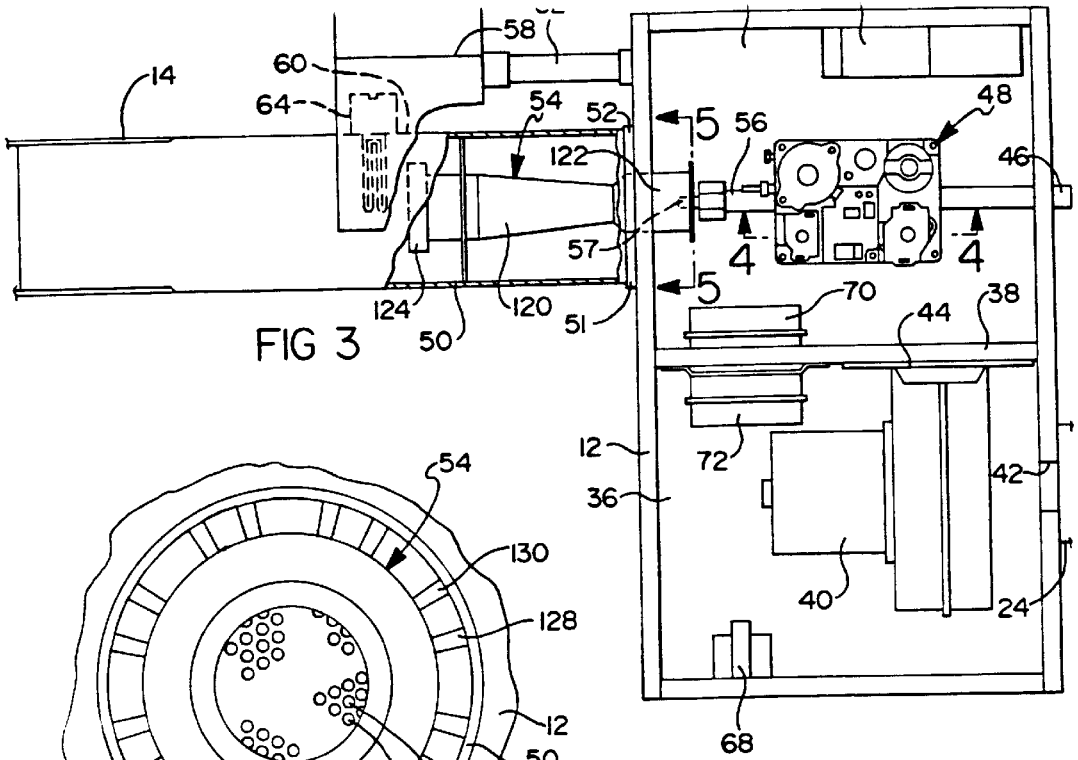
FIG. 3 is a sectional view taken along line 3—3 of FIG. 1.

Referring to FIG. 1, a typical installation of a demand radiant heating system 10, according to the present invention, is illustrated in a building such as a warehouse to heat a specific location therein. The demand radiant heating system 10 includes a component housing 12 and an elongated linear radiant heating tube 14 which extends therefrom. The demand radiant heating system 10 includes a reflector 16 secured to the tube 14 by suitable means such as a plurality of brackets 18 as illustrated in FIG. 2. The component housing 12 and brackets 18 are suspended from a ceiling 20 of the building by suitable means such as chains 22.

The demand radiant heating system 10 also includes an intake tube 24 connected to the component housing 12 and extending through a wall 26 of the building to allow air to enter the component housing 12. The intake tube 24 may have a shield 28 at the end thereof The radiant heating tube 14 also extends through a wall 30 of the building to allow cooled exhaust gases or combustion products to exit to the atmosphere outside of the building being heated. The tube 14 may have a vent cap or member 32 at the end thereof to vent the exiting exhaust gases. It should be appreciated that in some buildings the air intake may be through the ceiling 20 and/or the gases may be exhausted directly through the ceiling 20 or within the building at a point above the heating system 10. It should also be appreciated that the chains 22 space the heating system 10 from the ceiling so as to avoid undue heating of the ceiling 20.

Referring to FIG. 3, the component housing 12 is internally divided into two compartments 34 and 36 that are gas sealed from each other by a divider 38. The component housing 12 includes an air blower 40 mounted within the compartment 36. The blower 40 draws ambient air from the intake tube 24 through an aperture 42 in the component housing 12 and expels it into the compartment 34 through an aperture 44 in the divider 38. It should be appreciated that the amount and pressure of intake air is controlled by the size of the blower 40 and the blower intake so as to result in an optimum air/fuel mixture.

The component housing 12 also includes a fuel line 46 that extends into the compartment 34 to allow fuel from a fuel source (not shown) to enter the component housing 12. The fuel is typically natural gas although any suitable fuel such as propane may be used. The component housing 12 further includes a regulator, generally indicated at 48, mounted within the compartment 34 and connected to the fuel line 46. The fuel regulator 48 is of a two-stage type to provide fuel at two different pressures for low demand and high demand heating to be described.

The demand radiant heating system 10 also includes a relatively short burner tube 50 interconnecting the radiant heating tube 14 and component housing 12. The burner tube 50 has a flange 51 secured to the component housing 12 by suitable means such as fasteners (not shown). Pressurized air in the compartment 34 passes into the burner tube 50 via an aperture 52 in a wall of the component housing 12. The demand radiant heating system 10 includes a burner, generally indicated at 54, disposed in the burner tube 50 and extending through the aperture 52 into the compartment 34. The regulator 48 has a connecting line 56 and fuel orifice 57 extending into one end of the burner 54. It should be appreciated that fuel enters the burner 54 through the connecting line 56 and fuel orifice 57.

The demand radiant heating system 10 further includes a substantially gas-tight sensor housing 58 mounted on the burner tube 50 over an aperture or opening 60 therein. The sensor housing 58 is also connected to the compartment 34 of the component housing 12 via an air tube or conduit 62. Pressurized air from the compartment 34 passes through the air tube 62 into the sensor housing 58 and through the opening 60 into the burner tube 50. The demand radiant heating system also includes a glow bar ignitor 64 mounted in the sensor housing 58 and in line with the opening 60. The glow bar ignitor 64 serves as an ignitor for igniting the air/fuel mixture in the burner 54 and as a sensor to open the circuit thereto when the glow bar ignitor 64 reaches a predetermined temperature, for example, 2,200° F. Such a glow bar ignitor 64 is commercially available from the Norton Company of Worcester, Mass.

The demand radiant heating system 10 also includes an ignition control module 66 mounted in the compartment 34 and connected to the glow bar ignitor 64 as will be described. The demand radiant heating system 10 further includes a transformer 68 mounted in the compartment 36 and connected to the ignition control module 66 and a source of power (not shown) such as 120 V AC as will be described. The demand radiant heating system 10 further includes a pair of differential pressure switches such as a burner pressure switch 70 mounted on the divider 38 in the compartment 34 and an intake pressure switch 72 mounted on the divider 38 in the compartment 36. The burner pressure switch 70 senses the air flow in the compartment 34 and shuts off the system 10 before it produces over a predetermined amount of carbon monoxide (CO) such as 0.04%. The intake pressure switch 72 senses the air flow in the compartment 36 and shuts off the system 10 before it produces over a predetermined amount of carbon monoxide (CO) such as 0.04%. It should be appreciated that the switches 70 and 72 are connected by suitable means to the ignition control module 66 and to an atmospheric pressure reference.

Referring to FIG. 2, the radiant heating tube 14 may include an elongated sinuous deflector 74 disposed therein to cause the exhaust gases to follow a helical path. The deflector 74 serves to control the velocity of the exhaust gases and to control the pressure and velocity of the exhaust gases within the tube 14. It should be appreciated that the radiant heating tube 14 may be U-shaped and contain a plurality of the deflectors 74.

Referring to FIG. 4, the fuel regulator 48 includes a housing 76 having an inlet 78 and an outlet 80 interconnected by an internal primary passageway 82. The fuel line 46 is connected to the inlet 78 and the connecting line 56 is connected to the outlet 80. The regulator 48 also includes a conical inlet screen 84 disposed in the primary passageway 82 after the inlet 78 and a manual valve 86 disposed adjacent thereto. The manual valve 86 is loaded by a spring 88 to open and close a first opening 90 in the primary passageway 82. The manual valve 86 has a manual fuel knob 92 for adjusting the position of the manual valve 86 relative to the first opening 90. The fuel regulator 48 also includes a redundant (pilot) solenoid 94 for opening and closing a second opening 96 in the primary passageway 82. The fuel regulator 48 has a secondary passageway 98 connected to the primary passageway 82 after the second opening 96 and communicating with the outlet 80. The fuel regulator 48 includes a main solenoid 100 for opening and closing a first opening 102 in the secondary passage way 98 and a second stage solenoid 104 connected to the regulator valve 106 for increasing and decreasing a manifold pressure of the fuel. The second stage solenoid 104 includes a low regulator adjust 108 connected to the regulator valve 106 to adjust the manifold pressure for a first and second stage of operation. The fuel regulator 48 also includes a conical outlet screen 110 disposed in the primary passageway 82 before the outlet 80 and a main valve 112 disposed in the primary passageway 82 before the outlet screen 110. The main valve 112 is loaded by a spring 114 and controlled by a diaphragm 116 to open and close a third opening 118 in the primary passageway 82. The diaphragm 116 moves the main valve 112 in response to fuel pressure from the second passageway 98 to the outlet 80 on one side of the diaphragm 116. Such a fuel regulator 48 is commercially available from White-Rodgers, St. Louis, Mo.

In operation, fuel enters the inlet 78 and flows past the inlet screen 84, manual valve 86 and opening 96, main valve 112, outlet screen 110 and through the outlet 80. If high demand is required, the second stage solenoid 104 is energized and exerts force on the regulator valve 106, increasing the manifold pressure for a first stage of operation. If low demand is required, the second stage solenoid 104 is de-energized and relaxes the regulator valve 106, decreasing the manifold pressure for a second stage of operation. The fuel regulator 48 provides a low fuel pressure such as 1.6 inch W.C. for low demand and a high fuel pressure such as 3.5 inch W.C. for high demand over a ambient temperature range of −40° F. to 175° F.

Figure 5:
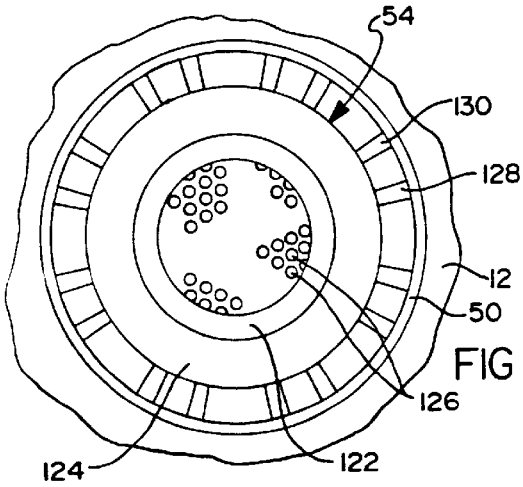
FIG. 5 is a sectional view taken along line 5—5 of FIG. 3.

Referring to FIGS. 3 and 5, the burner 54 is illustrated. The burner 54 has a venturi tube portion 120 having an inlet end 122 and outlet end 124. The inlet and outlet ends 122 and 124 each have a plurality of openings 126, preferably circular, to allow air and fuel to pass therethrough. The inlet end 122 has a plurality of vanes 128 spaced circumferentially thereabout to swirl the air passing the exterior of the inlet end 122. The outlet end 124 also has a plurality of vanes 130 spaced circumferentially thereabout to swirl the air passing the exterior of the outlet end 124. The vanes 128 and 130 locate and support the inlet end 122 and outlet end 124 in the burner tube 50.

Figure 6:
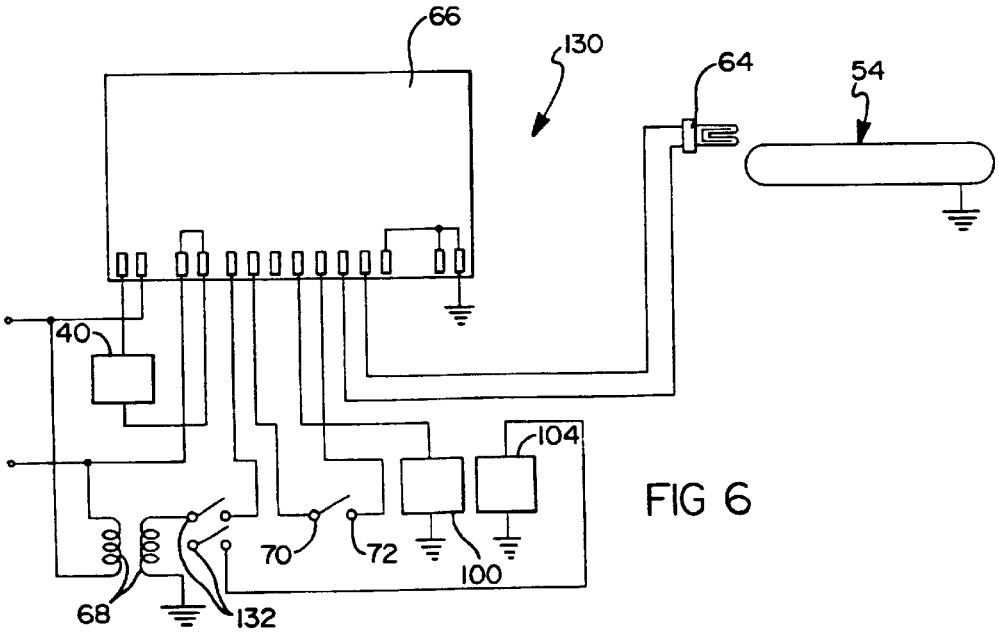
FIG. 6 is a schematic diagram of an electrical system for the demand radiant heating system of FIG. 1.

Referring to FIG. 6, a schematic diagram of an electrical circuit 130 for the demand radiant heating system is illustrated. The electrical circuit 130 includes the ignition control module 66 connected to a source of power such as 120 V alternating current. The ignition control module 66 is also connected to the glow bar ignitor 64, which is adjacent the burner 54, the main solenoid 100 and the blower 40. The electrical circuit 130 includes the transformer 68 connected across the source of power and a two-stage thermostat 132 connected to the transformer 68. The thermostat 132 is also connected to the second stage solenoid 104. The electrical circuit 130 also has the switches 70 and 72 connected to the ignition control module 66. Such a thermostat 132 is commercially available from White-Rodgers Division of Emerson Electric Co., St. Louis, Mo. It should be appreciated that the thermostat 132 allows the radiant heating system 10 to provide demand heating at any time the temperature of the space being heated is below a predetermined temperature.

In operation, air enters the intake tube 24 through the vent member 28 and flows into the component housing 12 through the opening 42. The blower 40 pressurizes the air and passes the pressurized air into the compartment 34. Pressurized air from the compartment 34 flows through the air conduit 62, sensor housing 58 and opening to cool the glow bar ignitor 64. Pressurized air from the compartment 34 also flows past the burner 54 whereby the air is swirled by the vanes 128 and 130 into the burner tube 50. Pressurized air from the compartment 34 further flows through the openings 126 and into the burner 54.

The ignition control module 66 receives voltage from a source of power and controls the blower 40. The transformer 68 reduces the voltage from 120 volts AC to 24 volts DC to the two-stage thermostat 132. The thermostat 132 may be set at a first predetermined temperature, for example 70° F., for a low demand temperature setting and at a second predetermined temperature, for example 60° F., for a high demand temperature setting. If the temperature in the space being heated is below 60° F., the thermostat 132 triggers power to the second stage solenoid 104 to increase the manifold pressure of the fuel. When the temperature rises above 60° F., the thermostat 132 cuts off or opens power to the second stage solenoid 104 to decrease the manifold pressure of the fuel. When the temperature rises above 70° F., the thermostat 132 cuts off or opens power to the ignition control module 66. It should be appreciated that a low fuel pressure provides less fuel for burning, resulting in less radiant heat, and a high fuel pressure provides more fuel for burning, resulting in more radiant heat.

The fuel from the fuel regulator 48 flows through the connecting line 56 and fuel orifice 57 to mix with the air entering the openings 126 of the burner 54. The ignition control module 66 triggers power to the glow bar ignitor 64 to ignite the air/fuel mixture in the burner. 54. The ignition results in combustion of the air/fuel mixture and hot exhaust gases or combustion products are produced. When these gases reach a predetermined temperature sensed by the ignitor 64, the module 66 cuts off or opens power to the ignitor 64. The hot exhaust gases are swirled by the deflectors 74 to heat the radiant heating tube 14 which radiates heat to the space being heated. The exhaust gases cool due to heat transfer and exit the radiant heating tube 14 through the vent member 32.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A demand radiant heating system comprising:

an elongated radiant heating tube having an inlet end and an exhaust end;

a burner tube connected to said inlet end of said radiant heating tube;

a housing defining an air tight compartment connected to said burner tube, a blower for continually forcing air into said air tight compartment;

a burner at least partially disposed in said burner tube, said burner having an inlet end to receive air and fuel, means for mixing air and fuel, and an exit end for emitting the air/fuel mixture for combustion closely adjacent thereto; and single fuel means disposed in said air tight compartment and operatively connected to said inlet end of said burner for providing regulation of fuel to said burner at a plurality of predetermined pressures for demand heating, whereby fuel and air is mixed and burned by said burner to heat said radiant heating tube and exhaust gases exit said exhaust end; and temperature means connected to said fuel means for triggering said predetermined pressures at a plurality of temperature settings.

2. A demand radiant heating system as set forth in claim 1 wherein said fuel means comprises a fuel regulator having a low fuel pressure for low demand heating and a high fuel pressure for high demand heating.

3. A demand radiant heating system as set forth in claim 1 wherein said temperature means comprises a two-stage thermostat having a low demand temperature setting and a high demand temperature setting.

4. A demand radiant heating system comprising:

an elongated radiant heating tube having an inlet end and an exhaust end;

a burner operatively connected to said inlet end of said radiant heating tube, said burner having an inlet end, an outlet end, and a venturi shaped tube portion interconnecting said inlet end and said outlet end;

fuel means operatively connected to said burner for providing fuel to said burner at a plurality of predetermined pressures for demand heating, whereby fuel and air is mixed and burned by said burner to heat said radiant heating tube and exhaust gases exit said exhaust end;

wherein said inlet end and said outlet end of said burner each have a plurality of openings to allow air and fuel to pass therethrough.

5. A demand radiant heating system comprising:

an elongated radiant heating tube having an inlet end and an exhaust end;

a burner operatively connected to said inlet end of said radiant heating tube, said burner having an inlet end, an outlet end, and a venturi shaped tube portion interconnecting said inlet end and said outlet end;

fuel means operatively connected to said burner for providing fuel to said burner at a plurality of predetermined pressures for demand heating, whereby fuel and air is mixed and burned by said burner to heat said radiant heating tube and exhaust gases exit said exhaust end; and wherein said inlet end and said outlet end of said burner each have a plurality of vanes spaced circumferentially thereabout to swirl air passing thereby.

6. A demand radiant heating system as set forth in claim 1 including means disposed adjacent said burner for igniting an air/fuel mixture in said burner and for sensing a predetermined temperature of said burner.

7. A demand radiant heating system as set forth in claim 6 wherein said igniting and sensing means comprises a glow bar ignitor.

8. A demand radiant heating system comprising: an elongated radiant heating tube having an inlet end and an exhaust end;

a burner tube connected to said inlet end of said radiant heating tube;

a housing defining an air tight compartment connected to said burner tube;

a blower for continually forcing air into said air tight compartment;

a burner at least partially disposed in said burner tube, said burner having an inlet end to receive air and fuel, means for mixing air and fuel, and an exit end for emitting the air/fuel mixture for combustion closely adjacent thereto;

a single fuel regulator disposed in said air tight compartment and operatively connected to said burner for providing regulation of fuel to said burner at a low fuel pressure for low demand heating and a high fuel pressure for high demand heating, whereby fuel and air is mixed and burned by said burner to heat said radiant heating tube and exhaust gases exit said exhaust end; and temperature means connected to said fuel regulator for triggering said low fuel pressure and said high fuel pressures at a plurality of temperature settings.

9. A demand radiant heating system as set forth in claim 8 wherein said temperature means comprises a two-stage thermostat having a low demand temperature setting for triggering said low fuel pressure and a high demand temperature setting for triggering said high fuel pressure.

10. A demand radiant heating system comprising:

an elongated radiant heating tube having an inlet end and an exhaust end;

a burner tube connected to said inlet end of said radiant heating tube;

a burner at least partially disposed in said burner tube; a fuel regulator operatively connected to said burner for providing fuel to said burner at a low fuel pressure for low demand heating and a high fuel pressure for high demand heating, whereby fuel and air is mixed and burned by said burner to heat said radiant heating tube and exhaust gases exit said exhaust end;

said burner having an inlet end, an outlet end, and a venturi shaped tube portion interconnecting said inlet end and said outlet end; and wherein said inlet end and said outlet end of said burner each have a plurality of openings to allow air and fuel to pass therethrough.

11. A demand radiant heating system comprising: an elongated radiant heating tube having an inlet end and an exhaust end;

a burner tube connected to said inlet end of said radiant heating tube;

a burner at least partially disposed in said burner tube;

a fuel regulator operatively connected to said burner for providing fuel to said burner at a low fuel pressure for low demand heating and a high fuel pressure for high demand heating, whereby fuel and air is mixed and burned by said burner to heat said radiant heating tube and exhaust gases exit said exhaust end;

said burner having an inlet end, an outlet end, and a venturi shaped tube portion interconnecting said inlet end and said outlet end; and wherein said inlet end and said outlet end of said burner each have a plurality of vanes spaced circumferentially thereabout to swirl air passing thereby.

12. A demand radiant heating system as set forth in claim 8 including means disposed adjacent said burner for igniting an air/fuel mixture in said burner and for sensing a predetermined temperature of said burner.

13. A demand radiant heating system as set forth in claim 12 wherein said igniting and sensing means comprises a glow bar ignitor.

14. A demand radiant heating system comprising:

an elongated radiant heating tube having an inlet end and an exhaust end;

a burner tube connected to said inlet end of said radiant heating tube;

a housing defining an air tight compartment connected to said burner tube;

a blower for continually forcing air into said air tight compartment;

a burner at least partially disposed in said burner tube, said burner having an inlet end to receive air and fuel, means for mixing air and fuel, and an exit end for emitting the air/fuel mixture for combustion closely adjacent thereto;

a single fuel regulator disposed in said air tight compartment and operatively connected to said burner for providing dual regulation of fuel to said burner at a low fuel pressure for low demand heating and a high fuel pressure for high demand heating;

a two-stage thermostat connected to said fuel regulator and having a low demand temperature setting for triggering said low fuel pressure and a high demand temperature setting for triggering said high fuel pressure; and whereby fuel and air is mixed and burned by said burner to heat said radiant heating tube and exhaust gases exit said exhaust end.

15. A demand radiant heating system as set forth in claim 14 including a glow bar ignitor disposed adjacent said burner for igniting an air/fuel mixture in said burner and for sensing a predetermined temperature of said burner.

*16. A demand radiant heating system comprising:*

*an elongated radiant heating tube having an inlet end and an exhaust end;*

*a burner operatively connected to said inlet end of said radiant heating tube;*

*a single fuel regulator operatively connected to said burner for providing regulation of fuel to said burner at a plurality of predetermined pressures for demand heating; and*

*temperature means operatively connected to said single fuel regulator for triggering said predetermined pressures at a plurality of temperature settings.*

*17. A demand radiant heating system comprising:*

*an elongated radiant heating tube having an inlet end and an exhaust end;*

*a burner operatively connected to said inlet end of said radiant heating tube;*

*a single fuel regulator operatively connected to said burner for providing regulation of fuel to said burner at a plurality of predetermined pressures for demand heating; and*

*a thermostat operatively connected to said single fuel regulator for triggering said predetermined pressures at a plurality of temperature settings.*

*18. A demand radiant heating system comprising:*

*an elongated radiant heating tube having an inlet end and an exhaust end;*

*a housing operatively connected to said inlet end of said radiant heating tube;*

*a burner at least partially disposed in said housing, said burner having an inlet end to receive air and fuel and an exit end for emitting an air and fuel mixture for combustion closely adjacent thereto;*

*a single fuel regulator disposed in said housing and operatively connected to said inlet end of said burner for providing regulation of fuel to said burner at a plurality of predetermined pressures for demand heating; and*

*temperature means operatively connected to said single fuel regulator for triggering said predetermined pressures at a plurality of temperature settings.*

*19. A demand radiant heating system comprising:*

*an elongated radiant heating tube having an inlet end and an exhaust end;*

*a housing operatively connected to said inlet end of said radiant heating tube;*

*a burner at least partially disposed in said housing;*

*a single fuel regulator operatively connected to said burner for providing a low fuel pressure for low demand heating and a high fuel pressure for high demand heating; and*

*a thermostat operatively connected to said single fuel regulator for triggering said low fuel pressure and said high fuel pressure at a plurality of temperature settings.*

*20. A demand radiant heating system comprising:*

*an elongated radiant heating tube having an inlet end and an exhaust end;*

*a housing defining an air tight compartment operatively connected to said heating tube;*

*a burner operatively connected to said inlet end of said radiant heating tube;*

*a single fuel means disposed in said air tight compartment and operatively connected to said burner for providing regulation of fuel to said burner at a plurality of predetermined pressures for demand heating; and*

*temperature means operatively connected to said single fuel means for triggering said predetermined pressures at a plurality of temperature settings.*

* * * * *

US00RE37636F1

(12) EX PARTE REEXAMINATION CERTIFICATE (6910th)

United States Patent

Wortman et al.

(10) Number: US RE37,636 F1

(45) Certificate Issued: Jul. 7, 2009

(54) DEMAND RADIANT HEATING SYSTEM

(75) Inventors: Joseph B. Wortman, Grosse Pointe, MI (US); Cory A. Weiss, Warren, MI (US)

(73) Assignee: Detroit Radiant Products Co., Detroit, MI (US)

Reexamination Request:
No. 90/006,773, Sep. 10, 2003

Reexamination Certificate for:

| | |
|---|---|
| Patent No.: | **Re. 37,636** |
| Issued: | **Apr. 9, 2002** |
| Appl. No.: | **08/728,215** |
| Filed: | **Oct. 10, 1996** |

Related U.S. Patent Documents

Reissue of:

| | |
|---|---|
| (64) Patent No.: | **5,353,986** |
| Issued: | **Oct. 11, 1994** |
| Appl. No.: | **08/077,558** |
| Filed: | **Jun. 15, 1993** |

(51) Int. Cl.

| | |
|---|---|
| ***F24D 5/08*** | (2006.01) |
| ***F24D 5/00*** | (2006.01) |
| ***F23N 1/00*** | (2006.01) |
| ***F23N 5/00*** | (2006.01) |
| ***F23N 5/02*** | (2006.01) |
| ***F23N 5/10*** | (2006.01) |
| ***G05D 23/00*** | (2006.01) |

(52) U.S. Cl. ..... 237/2 R; 237/2 A; 237/70; 236/36; 126/92 AC

(58) Field of Classification Search ..... 431/12, 431/9, 10, 67, 62, 63, 66, 353; 236/1 E, 1 EA, 236/1 EB, 36; 126/91 A, 116 A; 237/70; 137/489, 489.5, 490, 495

See application file for complete search history.

(56) References Cited

U.S. PATENT DOCUMENTS

| | | | | | |
|---|---|---|---|---|---|
| 2,672,291 | A | * | 3/1954 | Rifle | 236/9 R |
| 2,685,411 | A | * | 8/1954 | Penn et al. | 236/68 B |
| 2,685,412 | A | * | 8/1954 | Schell | 236/68 B |
| 2,909,218 | A | * | 10/1959 | Matthews | 236/9 R |
| 3,208,935 | A | * | 9/1965 | Nesbitt | 210/749 |
| 3,307,785 | A | * | 3/1967 | Currie | 236/80 R |
| 3,399,833 | A | * | 9/1968 | Johnson | 237/53 |
| 3,526,360 | A | * | 9/1970 | Ray | 236/68 R |
| 3,685,732 | A | * | 8/1972 | Haskins et al. | 236/68 R |
| 3,763,847 | A | * | 10/1973 | Guzdar et al. | 126/92 B |
| 3,810,578 | A | * | 5/1974 | Matthews | 236/80 R |
| 3,843,049 | A | * | 10/1974 | Baysinger | 236/1 E |
| 3,880,186 | A | * | 4/1975 | Turner et al. | 137/495 |

(Continued)

FOREIGN PATENT DOCUMENTS

| | | | | |
|---|---|---|---|---|
| EP | 0391818 | * | 10/1990 | |
| GB | 000721750 | * | 1/1955 | 431/182 |

OTHER PUBLICATIONS

International Approval Services Certification Report No. C2895002, Revised Jan. 6, 1994.

Suntube IV Low–Intensity Infra–Red Systems Installaton, Operation and Maintenance Instructions, pp. 16, 32.

White Rogers Publication No. 1–88 R–3602, Gas Burner Controls, p. 79.

White Rodgers Publication Part No. 37–3421.

*Primary Examiner*—Sara S Clarke

(57) ABSTRACT

A demand radiant heating system includes an elongated radiant heating tube and a burner operatively connected to the tube and a fuel regulator connected to the burner for providing fuel to the burner at a plurality of fuel pressures to provide demand heating.

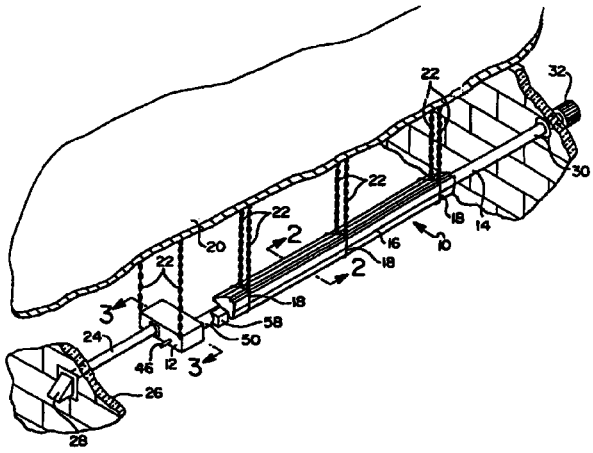

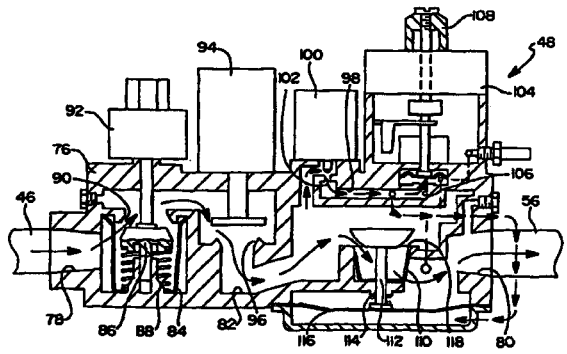

U.S. PATENT DOCUMENTS 3,923,446 A * 12/1975 Budden et al. ..... 431/114
4,053,279 A * 10/1977 Eichenlaub ..... 432/222
4,390,125 A * 6/1983 Rozzi ..... 237/70
4,421,268 A * 12/1983 Bassett et al. ..... 236/10
4,457,692 A * 7/1984 Erdman ..... 431/19
4,595,355 A * 6/1986 Garrelfs et al. ..... 431/265
4,602,610 A * 7/1986 McGinnis ..... 126/110 E
4,645,450 A 2/1987 West ..... 431/12
4,655,705 A * 4/1987 Shute et al. ..... 431/78
4,731,015 A * 3/1988 Johnson ..... 431/154
4,754,920 A * 7/1988 Turner et al. ..... 236/68 R
4,846,143 A * 7/1989 Csadenyi ..... 126/39 E
4,850,530 A * 7/1989 Uecker ..... 236/1 EB
4,869,229 A 9/1989 Johnson ..... 126/91
5,112,217 A 5/1992 Ripka et al. ..... 431/12
5,253,635 A * 10/1993 Overall et al. ..... 126/85 B
5,310,111 A * 5/1994 Linck ..... 236/49.4
5,353,986 A 10/1994 Wortman et al. ..... 237/2 R
5,361,750 A * 11/1994 Seel et al. ..... 126/91 A
5,429,112 A * 7/1995 Rozzi ..... 126/116 A

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentablity of claims 1–9, 11–15 and 20 is confirmed.

Claims 16–19 are cancelled.

Claim 10 is determined to be patentable as amended.

10. A demand radiant heating system comprising:

an elongated radiant heating tube having an inlet end and an exhaust end;

a burner tube connected to said inlet end of said radiant heating tube;

a burner at least partially disposed in said burner tube; a fuel regulator operatively connected to said burner *having a means* for providing fuel to said burner at a low fuel pressure for low demand heating and a high fuel pressure for high demand heating, whereby fuel and air is mixed and burned by said burner to heat said radiant heating tube and exhaust gases exit said exhaust end;

said burner having an inlet end, an outlet end, and a venturi shaped tube portion interconnecting said inlet end and said outlet end; and wherein said inlet end and said outlet end of said burner each have a plurality of openings to allow air and fuel to pass therethrough.

* * * * *